(12) United States Patent (10) Patent No.: US 8,949,308 B2
Chintalapati et al. (45) Date of Patent: Feb. 3, 2015

(54) BUILDING LARGE SCALE INFRASTRUCTURE USING HYBRID CLUSTERS

(75) Inventors: Murali M. Chintalapati, Bellevue, WA (US); Chunxiao Jia, Arlington, VA (US); Todd Pfleiger, Seattle, WA (US); Karthikeyan Subramanian, Redmond, WA (US); Shuishi Yang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 37 days.

(21) Appl. No.: 13/356,366

(22) Filed: Jan. 23, 2012

(65) Prior Publication Data

US 2013/0191436 A1 Jul. 25, 2013

(51) Int. Cl.
*G06F 15/173* (2006.01)

(52) U.S. Cl.
USPC ............................ 709/201; 709/224; 709/226

(58) Field of Classification Search
USPC .......................................... 709/201, 224, 226
See application file for complete search history.

(56) References Cited

U.S. PATENT DOCUMENTS

| | | | | |
|---|---|---|---|---|
| 7,840,969 | B2 * | 11/2010 | Comer | 719/314 |
| 8,296,271 | B1 * | 10/2012 | Richardson et al. | 707/674 |
| 8,332,497 | B1 * | 12/2012 | Gladish et al. | 709/223 |
| 8,484,163 | B1 * | 7/2013 | Yucel et al. | 707/640 |
| 2002/0156884 | A1 * | 10/2002 | Bertram et al. | 709/224 |
| 2002/0165864 | A1 * | 11/2002 | Azagury et al. | 707/10 |
| 2004/0205767 | A1 * | 10/2004 | Partanen | 719/312 |
| 2005/0198238 | A1 * | 9/2005 | Sim et al. | 709/222 |
| 2005/0256948 | A1 | 11/2005 | Hu | |
| 2006/0053216 | A1 * | 3/2006 | Deokar et al. | 709/223 |
| 2007/0150572 | A1 * | 6/2007 | Cox et al. | 709/223 |
| 2007/0256081 | A1 * | 11/2007 | Comer | 719/316 |
| 2009/0037902 | A1 * | 2/2009 | Gebhart et al. | 717/174 |
| 2009/0113034 | A1 * | 4/2009 | Krishnappa et al. | 709/223 |
| 2009/0300423 | A1 | 12/2009 | Ferris | |
| 2009/0313635 | A1 * | 12/2009 | Dasdan | 718/105 |
| 2010/0122065 | A1 * | 5/2010 | Dean et al. | 712/203 |
| 2010/0223618 | A1 * | 9/2010 | Fu et al. | 718/102 |
| 2011/0010691 | A1 | 1/2011 | Lu et al. | |
| 2012/0005522 | A1 * | 1/2012 | Kaminski | 714/4.11 |

(Continued)

OTHER PUBLICATIONS

Hanawa, et al., "Large-Scale Software Testing Environment Using Cloud Computing Technology for Dependable Parallel and Distributed Systems", In Proceedings of Third International Conference on Software Testing, Verification, and Validation Workshops, Apr. 6-10, 2010, pp. 428-433.

(Continued)

*Primary Examiner* — Jason K. Gee
*Assistant Examiner* — Sanchit Sarker
(74) *Attorney, Agent, or Firm* — Henry Gabryjelski; David Andrews; Micky Minhas

(57) ABSTRACT

A distributed computing system. The system separates management and worker functionality into different clusters thus relieving the worker clusters of management overhead. In particular, the system includes a management cluster. The management cluster is configured to perform service deployment of worker nodes, service maintenance of worker nodes, service upgrade and roll-back of worker nodes, service monitoring of worker nodes, and service reporting of worker nodes. The system further includes one or more worker clusters coupled the management cluster, but separate from the management cluster. Each of the worker clusters includes one or more worker nodes that are configured to provide one or more of processing power, storage, and network connectivity but do not exercise one or more of the management configured functions.

20 Claims, 2 Drawing Sheets

(56) References Cited

U.S. PATENT DOCUMENTS

| | | | | |
|---|---|---|---|---|
| 2012/0226788 | A1* | 9/2012 | Jackson | 709/223 |
| 2012/0317447 | A1* | 12/2012 | Yildiz et al. | 714/48 |
| 2013/0024037 | A1* | 1/2013 | Jin et al. | 700/292 |
| 2013/0028106 | A1* | 1/2013 | Frost | 370/252 |
| 2013/0191436 | A1* | 7/2013 | Chintalapati et al. | 709/201 |

OTHER PUBLICATIONS

Joseph, Joshy, "Patterns for High Availability, Scalability, and Computing Power with Windows Azure", Published on: May 2009, Available at: http://msdn.microsoft.com/en-us/magazine/dd727504.aspx.

"An introduction to cloud testing", Retrieved on: Nov. 1, 2011, Available at: http://www.businesscloudnews.com/applications/622-guest-post-an-introduction-to-cloud-testing-.html.

"LISA is the Essential Platform for Truly Elastic, Effective Pre-production Cloud Environments", Retrieved on: Nov. 1, 2011, Available at: http://www.itko.com/solutions/cloud.jsp.

"Atos Orgin Launches Cloud IT Testing Service", Retrieved on: Nov. 1, 2011, Available at: http://www.cloudpro.co.uk/saas/it-and-application-management/1023/atos-orgin-launches-cloud-it-testing-service.

* cited by examiner

BUILDING LARGE SCALE INFRASTRUCTURE USING HYBRID CLUSTERS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Further, interconnected computing systems can be used to implement cluster computing systems where several discrete systems work together to accomplish a computing task assigned to the cluster as a whole. Some such systems may have all, or a portion of the cluster deployed in the cloud. Cloud computing allows for computing resources to be provided as services rather than a deliverable product. In particular, computing power, software, information, network connectivity, etc. are provided (for example, through a rental agreement) over a network, such as the Internet.

Cloud services, such as Windows Azure® available from Microsoft® Corporation of Redmond Wash., provide virtually infinite scalability and high availability at low cost. However, this scalability may be limited by the ability to provision management functions on each cluster. In particular, management functions, such as service deployment, maintenance, upgrading and roll-back, and monitoring functionality represents a significant amount of work that is done on each cluster. Thus, the work that may be done at a cluster, exclusive of management functions, may be limited by the management functions also performed at that worker cluster.

Further, cloud computing enables new opportunities in test lab infrastructure development. However, traditional test labs rely on the purchase and self-maintenance of physical machines, giving the test team the burden of hardware installation, network setting, patching, etc. Under such a physical lab environment, flexibility of adding new hardware on the fly and removing idle hardware is also limited.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment may include a distributed computing system. The system includes a management cluster. The management cluster is configured to perform service deployment of worker nodes, service maintenance of worker nodes, service upgrade and roll-back of worker nodes, service monitoring of worker nodes, and service reporting of worker nodes. The system further includes one or more worker clusters coupled the management cluster, but separate from the management cluster. Each of the worker clusters includes one or more worker nodes that are configured to provide one or more of processing power, storage, and network connectivity but do not exercise one or more of the management configured functions.

Another embodiment includes a method of processing jobs for clients in a distributed system. The method includes at a management cluster in a distributed system, receiving a job from a client. The method further includes based on the job characteristics, at the management cluster, distributing the job to a worker cluster separate from the management cluster.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein implement a "hybrid cluster" architecture for building cloud computing infrastructure. In particular, embodiments may use a small management cluster to manage other worker clusters. This allows management functionality, such as service deployment, maintenance, upgrade and roll-back, and monitoring to be offloaded to the management cluster, leaving the worker clusters with more resources for performing cluster jobs.

In particular, embodiments may use a combination of one small size managed cluster to provide central monitoring, and several large size "raw" clusters to provide virtual machine environments with minimal service overheads. Various examples will be illustrated, including embodiments applied to general-purpose cloud computing and for testing cloud computing infrastructure.

In one particular example, "Blackbird" available from Microsoft® Corporation of Redmond Wash. is a mature cluster management and monitoring platform that is able to enable SQL Azure™ to run on Windows Azure®. Some embodiments illustrated herein are able to overcome the limits of "raw" Windows Azure® cluster's monitoring pipeline, and Blackbird managed Windows Azure® cluster's service overheads. Embodiments may use an infrastructure called "hybrid clusters"—which in one example is a combination of one small size management cluster, such as a Blackbird managed Windows Azure® cluster to provide central monitoring, and several large size worker clusters, such as "raw" Windows Azure® clusters to provide virtual machine environments with minimal service overheads.

Figure 1:
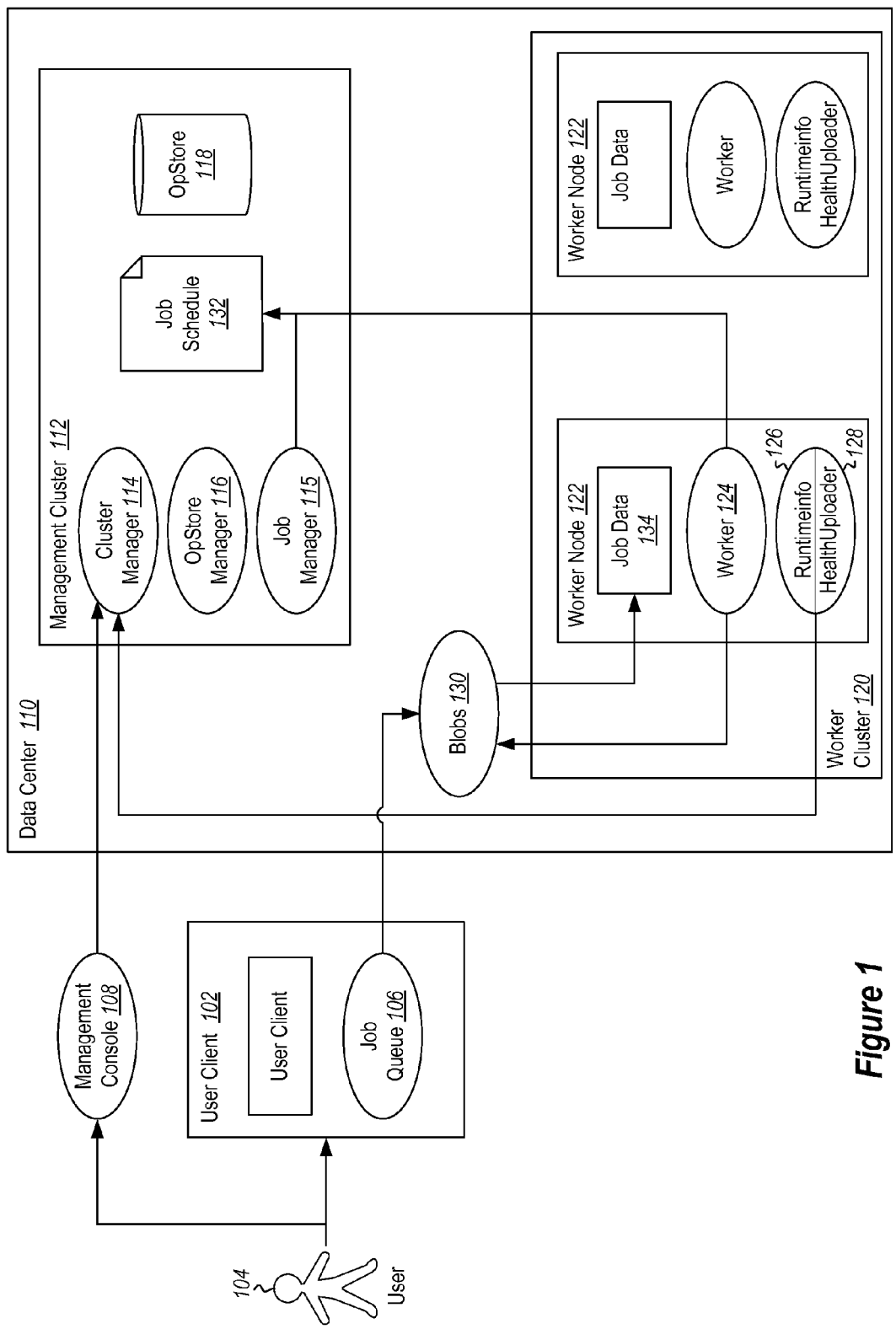
FIG. 1 illustrates cluster systems including a management cluster and a worker cluster.

Referring now to FIG. 1, an example is illustrated. FIG. 1 illustrates a user client 102. The user client interacts with users 104 and saves jobs into a job queue 106.

FIG. 1 further illustrates a management console 108. The management console 108 includes a user interface that allows users to monitor multiple environments and display multiple views. In some embodiments, the management console 108 may be implemented using Xts. Xts is the Autopilot/Blackbird management console available from Microsoft® Corporation of Redmond Wash.

FIG. 1 illustrates a data center 110. The data center 110 includes a management cluster 112. The management cluster 112 includes a job manager 115. The job manager 115 schedules jobs and monitors job status. The management cluster further includes a cluster manager 114, an OpStore manager 116, and an OpStore 118. The OpStore 118 stores operational and performance information. As noted, in some embodiments, the management cluster 112 may be implemented using a Blackbird managed cluster.

The data center 110 further includes a number of worker clusters. In the example illustrated, a single worker cluster 120 is illustrated, but it should be appreciated that virtually any number of worker clusters could be implemented. Each worker cluster may include a number of worker nodes. In the example illustrated, worker nodes 122-1 and 122-2 are shown. While only two worker nodes (referred to generally as 122) are shown, it should be appreciated that virtually any number of worker nodes 122 may be implemented in a worker cluster 120.

In the illustrated example, each worker node 122 includes a worker role instance, which may be referred to herein as a worker 124. The worker 124 is configured to start drivers and use the drivers to execute job cases. The worker 124 also traces job execution state.

In the illustrated example, each worker node 122 further includes a runtime information module 126. The runtime information module 126 includes topology information and communication end points. The runtime information module 126 also sends files to the management cluster 112.

In the illustrated example, each worker node 122 includes a health uploader module 128. The health uploader module 128 is a service loader that may collect information such as node status, performance counters, and other information and send such collected information to the management cluster 112. The management cluster may include a health store in the OpStore 118. The information sent form the health uploader module 128 can be stored in the OpStore 118.

The following now illustrates an example scenario implemented in one embodiment. In the example, the data center 110 is ready, which includes having a management cluster 112 and worker clusters 120, including worker nodes 122, deployed. One or more job drivers are deployed. Some embodiments may be implemented where, for a given job driver, the job driver is only deployed once if there are no change to the driver.

A user 104 uses the user client 102 to put a job into the job queue 106. In the example illustrated, the job queue 106 is a priority queue. In a priority queue, elements are pulled from the queue on a priority basis. As illustrated, a user client 102 periodically checks the job manager 115 about current job procession status. When the client 102 determines that the job manager 114 is ready, it retrieves a job from the job queue 106 and deploys job data into the blob 130. The job manager 114 checks the job and separates the job into job items and saves the items into a job item schedule 132. For example, the job may have 20 job suites. Each job item may be a suite. As such, the job schedule 132 has 20 job items.

Workers 124 on each worker node 122 check the job item queue periodically. When a worker 124 finds a job item, the worker 124 takes the item and updates the status. Updating the status may include a number of actions as follows. The worker 124 loads job data 134 from the blob 130 to the worker node 122. The worker 124 uses a job driver to run job data 134. The worker 124 reports status information into the OpStore database 118. Such status information may include a job state. For example, in some embodiments, job state may be classified as one of: ready, in-processing, completed, timed out, or canceled. Status information may additionally or alternatively include job results. For example, job results may be classified as one of pass, fail, or timed out. The worker 124 saves job log information into the blob 130 after each job is completed. The worker 124 then looks for a next job item repeating various actions as described above. The job manager 115 may add new job items into the work item queue if there is a new job.

Some embodiments may implement web APIs which make the management infrastructure available as a service for external users.

Embodiments implemented as described herein may allow for more efficiency. For example, assume that an embodiment implements 10 test suites, and the longest running time of the 10 suites is 4 hours. The other 9 test suites may take 2 hours. If the embodiment has 10 workers and each worker takes a suite, after about 4 hours, complete results can be obtained from all of the test suites. However, if this were run on a single machine, then results would take 22 hours to obtain.

Embodiments may facilitate scalability. For example, using the example just illustrated, embodiments may partition the 10 suites into smaller chunks if possible and add more test workers. Thus, the embodiments can further reduce the running time. For instance, if an embodiment partitions the same 10 suites into 100 suites and adds 100 test workers, where each suite takes 0.22 hours, results can be obtained in 0.22 hours.

Embodiments may further facilitate increased reliability and availability. Illustratively, if one or more test workers are down, other workers can take job items and complete jobs. Further, embodiments may be used to reduce development and management cost because only have to manage a single management cluster. Embodiments may also allow for scalability to scale up worker clusters.

As illustrated herein, embodiments may include a management cluster, such as the management cluster 112. The management cluster may be configured to perform various management functions to relive worker nodes of these management functions. For example, the management cluster may perform service deployment of worker nodes whereby services are deployed to worker nodes, such as worker nodes 122 illustrated in FIG. 1. The management cluster may perform maintenance of services on worker nodes. The management cluster may perform service upgrades and roll-back on worker nodes. The management cluster may perform service monitoring, such as monitoring service health status, on worker nodes. The management cluster may perform service reporting of worker nodes, such as reporting service functionality to a user, such as through the management console 108 illustrated in FIG. 1.

Embodiments may include one or more worker clusters coupled the management cluster. FIG. 1 illustrates a worker cluster 120 coupled to the management cluster 112. Each of the worker clusters includes one or more worker nodes (such as nodes 122) that are configured to provide one or more of processing power, storage, and network connectivity. As noted, in some embodiments, the worker nodes do not exercise one or more of the management configured functions, but rather have those functions offloaded to the management cluster 112.

The management cluster may be configured to add or remove nodes to the one or more work clusters based on an amount of work to be performed by the distributed computing system.

The distributed system may be configured to upload health information from worker nodes to the management cluster. For example, FIG. 1 illustrates a health uploader 128 that can be used to upload health information to the OpStore 118.

Embodiments may be implemented where the distributed system is coupled to a client external to the distributed system to receive jobs from the client to be performed by the distributed system. For example, as illustrated in FIG. 1, the distributed system 110 is coupled to the user client 102 to receive jobs from a user 104.

The management cluster may include a database, such as the OpStore 118, storing operational and performance information of worker nodes in the distributed system. In some embodiments, the database is configured to be queried by a user so that the user can monitor performance information for worker nodes. As noted, worker nodes may include a health uploader module configured to collect node status and send the node status to the management cluster for storage in the database storing operational and performance information. The health uploader module may configured to collect performance counters and send the performance counters to the management cluster for storage in the database storing operational and performance information.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
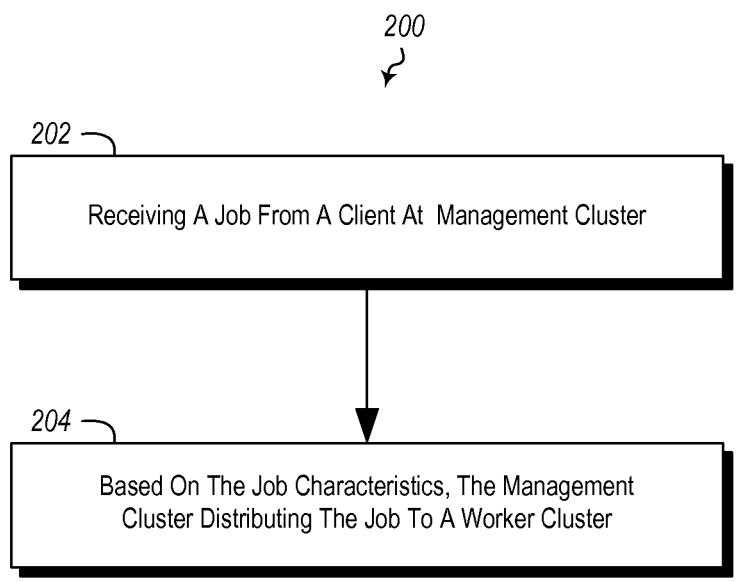
FIG. 2 illustrates a method of processing jobs for a client.

Referring now to FIG. 2, a method 200 is illustrated. One embodiment illustrated herein is directed to a method 200 of processing jobs for clients in a distributed system. The method includes, at a management cluster in a distributed system, receiving a job from a client (act 202). For example, the management cluster 112 may receive jobs from the user client 102. The method 200 further includes based on the job characteristics, at the management cluster, distributing the job to a worker cluster separate from the management cluster. For example, as illustrated in FIG. 1, jobs can be distributed to worker nodes 122 in the worker cluster 120.

The method 200 may further include receiving health information from the worker cluster. For example, as illustrated in FIG. 2, a worker node 122-1 can use the health uploader 120 to upload health information to the management cluster 112. In some embodiments, the method 200 further includes storing the health information in a user queryable database, such as the OpStore 118.

The method 200 may further include the management cluster deploying worker nodes in the worker cluster, performing maintenance on worker nodes in the worker cluster, performing at least one of update or roll-back on worker nodes in the worker cluster, performing monitoring of worker nodes in the worker cluster, performing service reporting of worker nodes in the worker cluster.

The method 200 may further include the management cluster maintaining a job database of job statuses of jobs assigned to the distributed computing system. For example, the job database may include information about incoming jobs, outgoing jobs, which cluster or node is performing a job, the results of a job, etc. This information could be user queryable.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A distributed computing system comprising one or more computer processors upon which is executing computer executable code, the system further comprising
    a management cluster which receives a job from a client, distributes the job to a particular worker cluster, the management cluster comprising a cluster manager, an OpStore, an OpStore Manager, and a job manager, the management cluster providing central monitoring of a set of one or more worker clusters which provide virtual machine environments for performing cluster jobs;
    the one or more worker clusters being separate from but coupled to the management cluster and including the particular worker cluster, wherein each of the worker clusters comprise one or more worker nodes that provide one or more of processing power, storage, and network connectivity such that the job may be performed but do not exercise one or more management configured functions performed by the management cluster; and
    wherein the management cluster performs service deployment of worker nodes, service maintenance of worker nodes, service upgrade and roll-back of worker nodes, service monitoring of worker nodes, and service reporting of worker nodes for each of the one or more worker clusters.

2. The system of claim 1, wherein the management cluster is configured to add or remove nodes to the one or more work clusters based on an amount of work to be performed by the distributed computing system.

3. The system of claim 1, wherein the distributed system is configured to upload health information from worker nodes to the management cluster.

4. The system of claim 1, wherein the distributed system is coupled to a client external to the distributed system to receive jobs from the client to be performed by the distributed system.

5. The system of claim 1, wherein the management cluster comprises a database storing operational and performance information of worker nodes in the distributed system.

6. The system of claim 5, wherein database is configured to be queried by a user so that the user can monitor performance information for worker nodes.

7. The system of claim 5, wherein at least one of the worker nodes comprises a health uploader module configured to collect node status and send the node status to the management cluster for storage in the database storing operational and performance information.

8. The system of claim 7, wherein the health uploader module is configured to collect performance counters and send the performance counters to the management cluster for storage in the database storing operational and performance information.

9. A method of processing jobs for clients in a distributed system, the method performed by executing computer executable instructions upon one or more computer processors, the method comprising:
    at a management cluster in a distributed system, receiving a job from a client, wherein the management cluster comprises each of a cluster manager, an OpStore, an OpStore Manager, and a job manager, the management cluster providing central monitoring of a set of one or more worker clusters which provide virtual machine environments for performing cluster jobs;
    based on the job characteristics, at the management cluster, distributing the job to a worker cluster, the worker cluster separate from the management cluster, the worker cluster being one of a plurality of worker clusters, and the worker cluster comprising one or more worker nodes; and
    the management cluster performing service deployment of worker nodes, service maintenance of worker nodes, service upgrade and roll-back of worker nodes, service monitoring of worker nodes, and service reporting of worker nodes for each of the plurality of worker clusters.

10. The method of claim 9 further comprising, receiving health information from the worker cluster.

11. The method of claim 10 further comprising, storing the health information in a user queryable database.

12. The method of claim 9 further comprising, the management cluster deploying worker nodes in the worker cluster.

13. The method of claim 9 further comprising, the management cluster performing maintenance on worker nodes in the worker cluster.

14. The method of claim 9 further comprising, the management cluster performing at least one of update or roll-back on worker nodes in the worker cluster.

15. The method of claim 9 further comprising, the management cluster performing monitoring of worker nodes in the worker cluster.

16. The method of claim 9 further comprising, the management cluster performing service reporting of worker nodes in the worker cluster.

17. The method of claim 9 further comprising, the management cluster maintaining a job database of job statuses of jobs assigned to the distributed computing system.

18. The method of claim 9 further comprising, the management cluster performing at least one of adding or removing nodes to the worker clusters based on an amount of work to be performed by the distributed computing system.

19. A distributed computing system comprising one or more computer processors upon which is executing computer executable code, the system further comprising a management cluster comprising:
- a cluster manager, wherein the cluster manager performs service deployment of worker nodes, service maintenance of worker nodes, and service upgrade and rollback of worker nodes for each of one or more worker clusters;
- an OpStore, the OpStore comprising a database which stores operational and performance information for worker nodes in the distributed computing system;
- an OpStore manager;
- a job item scheduler, the job item scheduler storing jobs for worker clusters;
- a job manager coupled to the job item scheduler, wherein the job manager saves job items to the job item schedule;

the management cluster providing central monitoring of a set of one or more worker clusters which provide virtual machine environments for performing cluster jobs, and wherein the management cluster receives a job from a client and distributes the job to a particular worker cluster such that the job may be performed by the particular worker cluster; and the one or more worker clusters being separate from the management cluster and coupled the management cluster, wherein each of the worker clusters comprise one or more worker nodes that provide one or more of processing power, storage, and network connectivity but do not exercise one or more management configured functions performed by the management cluster.

20. The system of claim 19, wherein at least one of the worker nodes comprises a health uploader module configured to collect node status and send the node status to the management cluster for storage in the database.

* * * * *